US009329700B2

(12) United States Patent
McGibney et al.

(10) Patent No.: US 9,329,700 B2
(45) Date of Patent: May 3, 2016

(54) INTERACTIVE SYSTEM WITH SUCCESSIVELY ACTIVATED ILLUMINATION SOURCES

(75) Inventors: Grant McGibney, Calgary (CA); David Holmgren, Calgary (CA); Lawrence Bruce Hewitt, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 730 days.

(21) Appl. No.: 13/522,078

(22) PCT Filed: Jan. 14, 2011

(86) PCT No.: PCT/CA2011/000036
§ 371 (c)(1),
(2), (4) Date: Aug. 12, 2013

(87) PCT Pub. No.: WO2011/085479
PCT Pub. Date: Jul. 21, 2011

(65) Prior Publication Data
US 2014/0022448 A1    Jan. 23, 2014

Related U.S. Application Data

(60) Provisional application No. 61/294,832, filed on Jan. 14, 2010, provisional application No. 61/306,451, filed on Feb. 20, 2010.

(51) Int. Cl.
*G06F 3/03*     (2006.01)
*G06F 3/042*    (2006.01)

(52) U.S. Cl.
CPC ............ *G06F 3/0308* (2013.01); *G06F 3/0428* (2013.01)

(58) Field of Classification Search
CPC .............................. G06F 3/0308; G06F 3/0428

USPC .................................. 348/370, 371; 359/892
See application file for complete search history.

(56) References Cited

U.S. PATENT DOCUMENTS 6,803,906 B1 * 10/2004 Morrison et al. ............. 345/173
7,232,986 B2 *  6/2007 Worthington et al. ........ 250/221
(Continued)

FOREIGN PATENT DOCUMENTS

CN    201 548 936 U    8/2010
EP      2 088 499 A1    8/2009
(Continued)

OTHER PUBLICATIONS

Transmittal; International Search Report; and the Written Opinion of the International Searching Authority for International Application No. PCT/CA2011/000036, (mailed May 9, 2011).
(Continued)

*Primary Examiner* — Lin Ye
*Assistant Examiner* — Chriss Yoder, III
(74) *Attorney, Agent, or Firm* — Perkins Coie LLP

(57) ABSTRACT

An illumination assembly for an interactive input system (20), comprises at least one imaging device (60) capturing image frames of a region of interest; a plurality of illumination sources (84a, 84b, 84c) associated with the imaging device and being located at different positions relative to the imaging device, the illumination sources providing illumination to the region of interest; and a controller (72) communicating with the illumination sources, the controller conditioning the illumination sources so that the illumination sources provide illumination to the region of interest in succession, the timing of image frame capture by the imaging device being coordinated with the illumination pattern of the illumination sources.

13 Claims, 16 Drawing Sheets

(56) References Cited

U.S. PATENT DOCUMENTS

| | | |
|---|---|---|
| 2003/0085871 A1 | 5/2003 | Ogawa |
| 2004/0178993 A1 | 9/2004 | Morrison et al. |
| 2007/0268398 A1 | 11/2007 | Raskar et al. |
| 2009/0213093 A1 | 8/2009 | Bridger |
| 2009/0277694 A1* | 11/2009 | Hansen et al. ............. 178/18.03 |

FOREIGN PATENT DOCUMENTS

| | | |
|---|---|---|
| JP | 2002-132435 A | 5/2002 |
| WO | 01/63550 A2 | 8/2001 |
| WO | 2005/031554 A1 | 4/2005 |
| WO | 2009/102681 A2 | 8/2009 |
| WO | 2009/135313 A1 | 11/2009 |
| WO | 2009/135320 A1 | 11/2009 |

OTHER PUBLICATIONS

Extended European Search Report for European Patent Application No. 11 732 602.5 with a mailing date of May 6, 2014.

* cited by examiner

INTERACTIVE SYSTEM WITH SUCCESSIVELY ACTIVATED ILLUMINATION SOURCES

CROSS REFERENCE TO RELATED APPLICATIONS

This application claims the benefit of U.S. Provisional Application No. 61/294,832 to McGibney et al. filed on Jan. 14, 2010 and U.S. Provisional Application No. 61/306,451 to McGibney et al. filed on Feb. 20, 2010, both entitled "INTERACTIVE INPUT SYSTEM AND ILLUMINATION SYSTEM THEREFOR", the entire contents of which are incorporated herein by reference.

FIELD OF THE INVENTION

The present invention relates to an interactive input system and to an illumination method therefor.

BACKGROUND OF THE INVENTION

Interactive input systems that allow users to inject input (e.g. digital ink, mouse events, etc.) into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the contents of which are incorporated by reference in their entirety; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Above-incorporated U.S. Pat. No. 7,232,986 to Worthington et al., discloses a camera-based touch system comprising a bezel that is illuminated by at least one light source, such as an array of infrared (IR) light emitting diodes (LEDs). Each light source is associated with and positioned adjacent each camera. The bezel reflects infrared light emitted by the at least one light source back towards the cameras. As a result, each camera sees a bright band of illumination within its field of view. When a pointer is positioned within the fields of view of the cameras, the pointer occludes the infrared illumination and therefore appears as a high-contrast dark region interrupting the bright band of illumination in each captured image allowing the existence of the pointer in captured images to be readily detected.

U.S. Patent Application Publication No. 2009/0058833 to Newton discloses an optical touch screen comprising a primary illumination source, a secondary illumination source and retro-reflective components positioned along the edge of the touch screen to reflect light, providing backlight to a light detection system. The primary illumination source (eg. a set of LEDs or diodes) emits light in a fan-shaped pattern with its apex aligned with the optical center of the detection system; while the secondary illumination source is not aligned with the optical center of the detection system. When an object is present, its position can be triangulated based on the direction of its shadow at the detection system.

U.S. Patent Application Publication No. 2009/0213093 to Bridger discloses an optical position sensing system including a plurality of radiation sources. The position of the radiation sources may be varied with respect to the aperture to achieve performance enhancement. Supplemental radiation sources may be positioned around the bezel so as to provide supplemental backlighting. Each of the plurality of supplemental radiation sources can be individually activated and deactivated, so as to selectively provide the supplemental backlighting to selected areas within the bezel.

U.S. Patent Application Publication No. 2009/0213094 to Bridger discloses an optical position sensing assembly including a body. An optical sensor is mounted to a rear face of the body and a radiation source is positioned within the body above the lens. A light path separator is positioned between the radiation source and an image window for the optical sensor, so that the radiation path is optically separated from the view path of the optical sensor.

Although the above-mentioned interactive input systems allow pointer contacts with the touch surfaces to be determined, in interactive input systems that employ retro-reflective material to return backlighting to imaging assemblies, a pointer may in certain circumstances cast a shadow that appears in captured image frames. Depending on the nature of the shadow, the shadow may be inadvertently detected as a pointer contact.

It is therefore an object of the present invention to provide a novel interactive input system and a novel method of reducing shadow pointer effects employed by the interactive input system.

SUMMARY OF THE INVENTION

Accordingly, in one aspect there is provided an interactive input system comprising at least one imaging device capturing image frames of a region of interest; a plurality of illumination sources associated with said imaging device and being located at different positions relative to said imaging device, said illumination sources providing illumination to said region of interest; and a controller communicating with said illumination sources, said controller conditioning said illumination sources so that the illumination sources provide illumination to said region of interest in succession, the timing of image frame capture by said imaging device being coordinated with the illumination pattern of said illumination sources.

In one embodiment, the one illumination source is generally vertically aligned with the at least one imaging device and is positioned above the at least one imaging device. At least one other illumination source is positioned to one side the imaging device and is in generally the same plane as the at least one imaging device. In another embodiment, at least one other illumination source is positioned on each side of the imaging device.

In one embodiment, the controller conditions the illumination sources so that for an exposure cycle of the at least one imaging assembly, the imaging assembly captures an image frame with each illumination source on and the other illumination sources off and an image frame with all illumination sources off. In one embodiment, the illumination sources are infrared (IR) illumination sources.

According to another aspect there is provided a method comprising acquiring image frames of a region of interest over an image sensor exposure cycle, each image frame being acquired in a different lighting scenario; and processing the image frames to detect the existence of a pointer therein.

BRIEF DESCRIPTION OF THE DRAWINGS

Embodiments will now be described more fully with reference to the accompanying drawings in which.

DETAILED DESCRIPTION OF THE EMBODIMENTS

Figure 1:
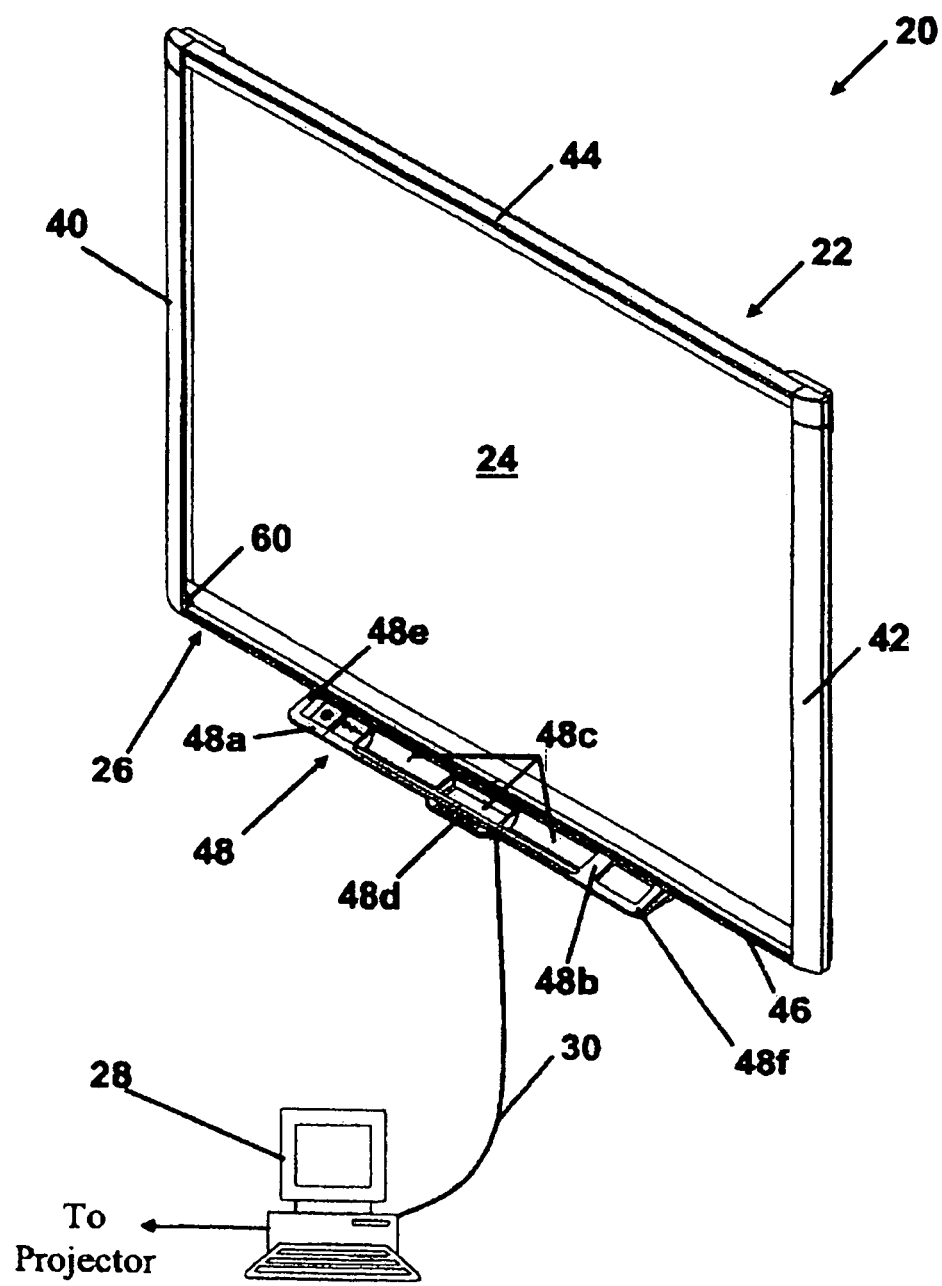
FIG. 1 is a schematic, partial perspective view of an interactive input system.
Figure 2:
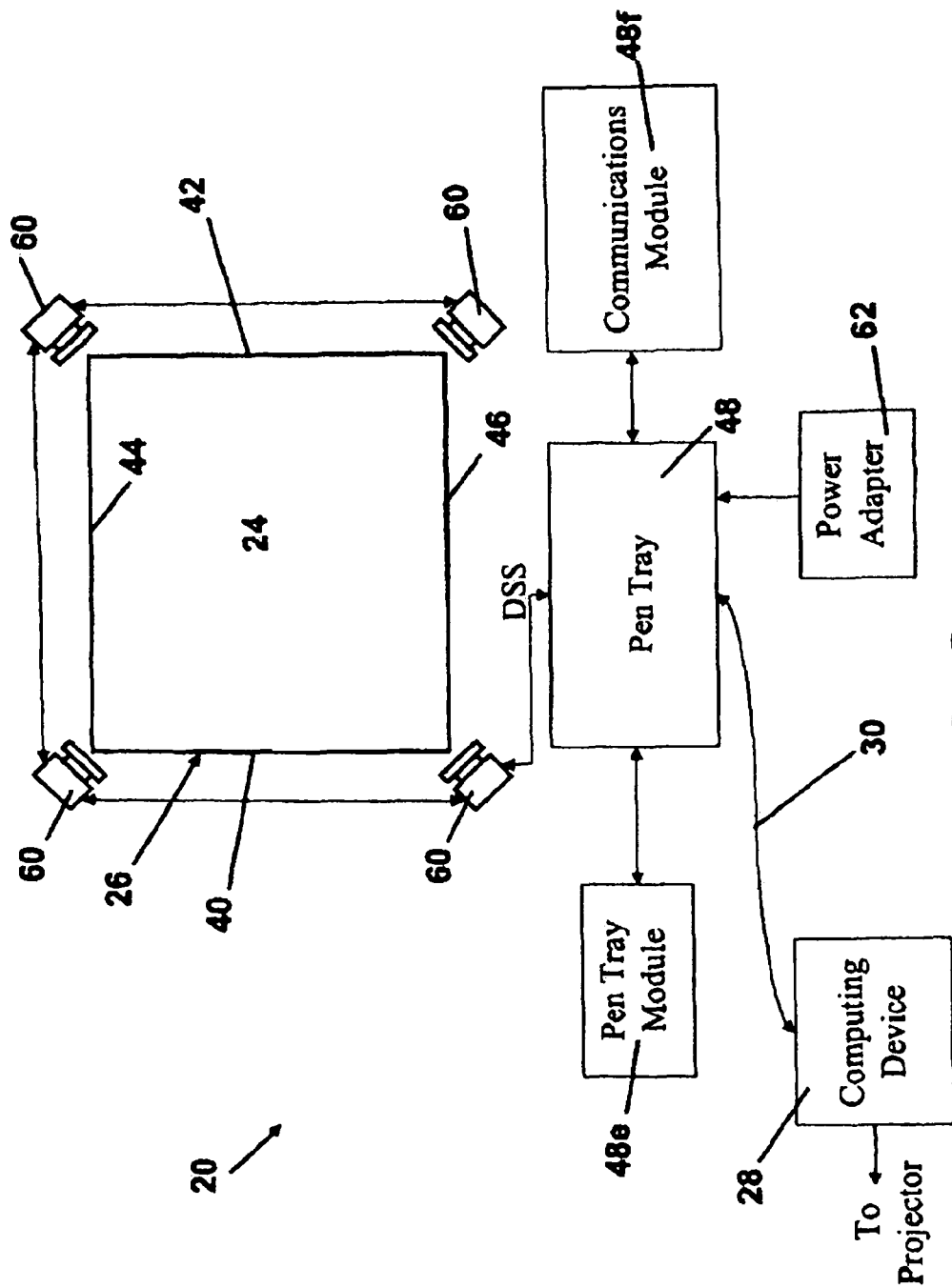
FIG. 2 is a block diagram of the interactive input system of FIG. 1.

Turning now to FIGS. 1 and 2, an interactive input system that allows a user to inject input such as digital ink, mouse events etc. into an application program executed by a computing device is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. An ultra-short throw projector (not shown) such as that sold by SMART Technologies ULC under the name SMART UX60 is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30. General purpose computing device 28 processes the output of the interactive board 22 and adjusts image data that is output to the projector, if required, so that the image presented on the interactive surface 24 reflects pointer activity. In this manner, the interactive board 22, general purpose computing device 28 and projector allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four linear segments 40, 42, 44, 46. Bezel segments 40 and 42 extend along opposite side edges of the interactive surface 24 while bezel segments 44 and 46 extend along the top and bottom edges of the interactive surface 24 respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 is affixed to the interactive board 22 adjacent the bezel segment 46 using suitable fasteners such as for example, screws, clips, adhesive etc. As can be seen, the tool tray 48 comprises a housing 48a having an upper surface 48b configured to define a plurality of receptacles or slots 48c. The receptacles 48c are sized to receive pen tools and an eraser tool (not shown) that can be used to interact with the interactive surface 24. Control buttons 48d are provided on the upper surface 48b to enable a user to control operation of the interactive input system 20. One end of the tool tray 48 is configured to receive a detachable tool tray accessory module 48e while the opposite end of the tool tray 48 is configured to receive a detachable communications module 48f for remote device communications. The housing 48a accommodates a master controller 50 (see FIG. 5) as will be described. Further specifics of the tool tray 48 are described in co-pending U.S. application Ser. No. 12/709,424 to Bolt et at entitled "INTERACTIVE INPUT SYSTEM AND PEN TOOL TRAY THEREFOR" filed on Feb. 19, 2010, the content of which is incorporated herein by reference in its entirety.

Imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as for example a user's finger, a cylinder or other suitable object, or a pen or eraser tool lifted from a receptacle 48c of the tool tray 48, that is brought into proximity of the interactive surface 24 appears in the fields of view of the imaging assemblies 60. A power adapter 62 provides the necessary operating power to the interactive board 22 when connected to a conventional AC mains power supply.

Figure 3:
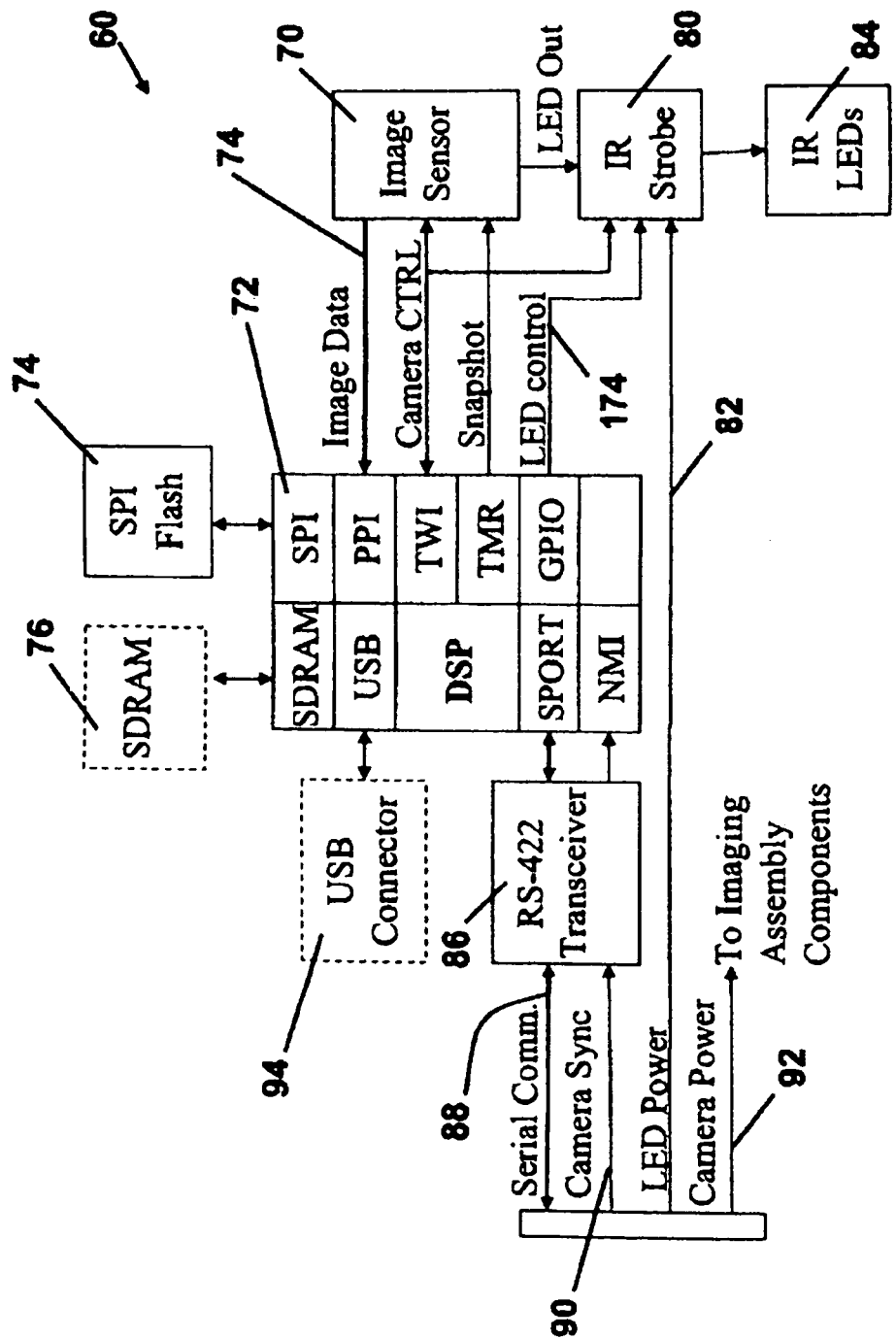
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Aptina (Micron) MT9V034 having a resolution of 752×480 pixels, fitted with a two element, plastic lens (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 74 via a parallel port interface (PPI). A serial peripheral interface (SPI) flash memory 74 is connected to the DSP 72 via an SPI port and stores the firmware required for image assembly operation. Depending on the size of captured image frames as well as the processing requirements of the DSP 72, the imaging assembly 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is between about 900 and about 960 frames per second. The DSP 72 in turn processes image frames received from the image sensor 72 and provides pointer information to the master controller 50 at a reduced rate of approximately 120 points/sec. Those of skill in the art will however appreciate that other frame rates may be employed depending on the desired accuracy of pointer tracking and whether multi-touch and/or active pointer identification is employed.

Three IR strobe circuits 80 communicate with the DSP 72 via the TWI and via a general purpose input/output (GPIO) interface. The IR strobe circuits 80 also communicate with the image sensor 70 and receive power provided on LED power line 82 via the power adapter 52. Each IR strobe circuit 80 drives a respective illumination source in the form of infrared (IR) light emitting diode (LEDs) 84a to 84c that provides infrared backlighting over the interactive surface 24 for the imaging assembly 60 during image capture.

The DSP 72 also communicates with an RS-422 transceiver 86 via a serial port (SPORT) and a non-maskable interrupt (NMI) port. The transceiver 86 communicates with the master controller 50 over a differential synchronous signal (DSS) communication link 88 and a synch line 90. Power for the components of the imaging assembly 60 is provided on power line 92 by the power adapter 52. DSP 72 may also optionally be connected to a USB connector 94 via a USB port as indicated by the dotted lines. The USB connector 94 can be used to connect the imaging assembly 60 to diagnostic equipment. Further, by using a similar architecture for both the imaging assembly 60 and the master controller 50, the same circuit board assembly and common components may be used for both thus reducing the part count and cost of the interactive input system. Differing components are added to the circuit board assemblies during manufacture dependent upon whether the circuit board assembly is intending for use in an imaging assembly 60 or in the master controller 50. For example, the master controller 50 may require a SRAM 76 whereas the imaging assembly 60 may not.

Figure 4A:
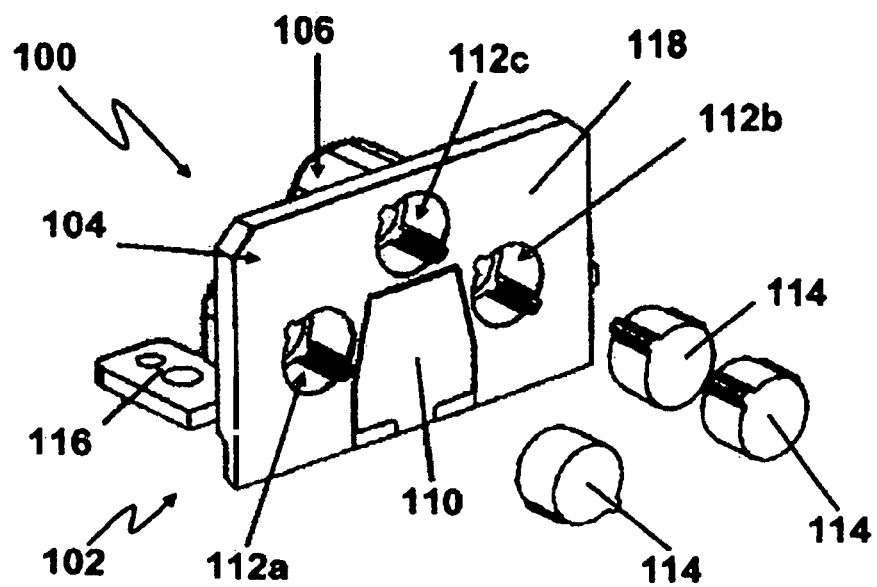
FIGS. 4a and 4b are front and rear perspective views of a housing assembly forming part of the imaging assembly of FIG. 3.
Figure 4B:
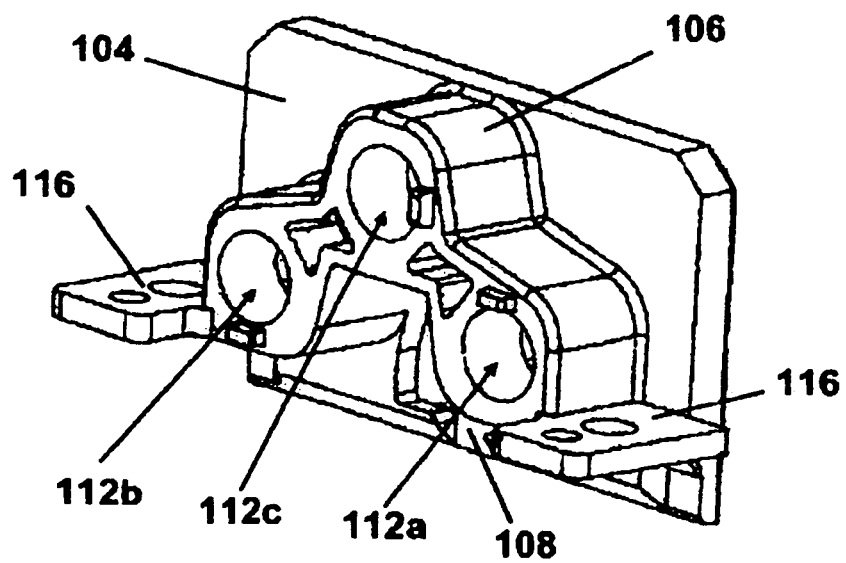

The image sensor 70 and its associated lens as well as the IR LEDs 84a to 84c are mounted on a housing assembly 100 that is best illustrated in FIGS. 4a and 4b. As can be seen, the housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 880 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. In particular, the socket 114 received in passage 112a accommodates IR LED 84a, the socket 114 received in passage 112b accommodates IR LED 84b, and the socket 114 received in passage 112c accommodates IR LED 84c. Mounting flanges 116 are provided on opposite sides of the rear portion 106 to facilitate connection of the housing assembly 100 to the bezel 26 via suitable fasteners. A label 118 formed of retro-reflective material overlies the front surface of the front portion 104. Further specifics concerning the housing assembly and its method of manufacture are described in co-pending U.S. application Ser. No. 12/709,419 to Liu et al. entitled "HOUSING ASSEMBLY FOR INTERACTIVE INPUT SYSTEM AND FABRICATION METHOD" filed on Feb. 19, 2010, the content of which is incorporated herein by reference in its entirety.

Figure 5:
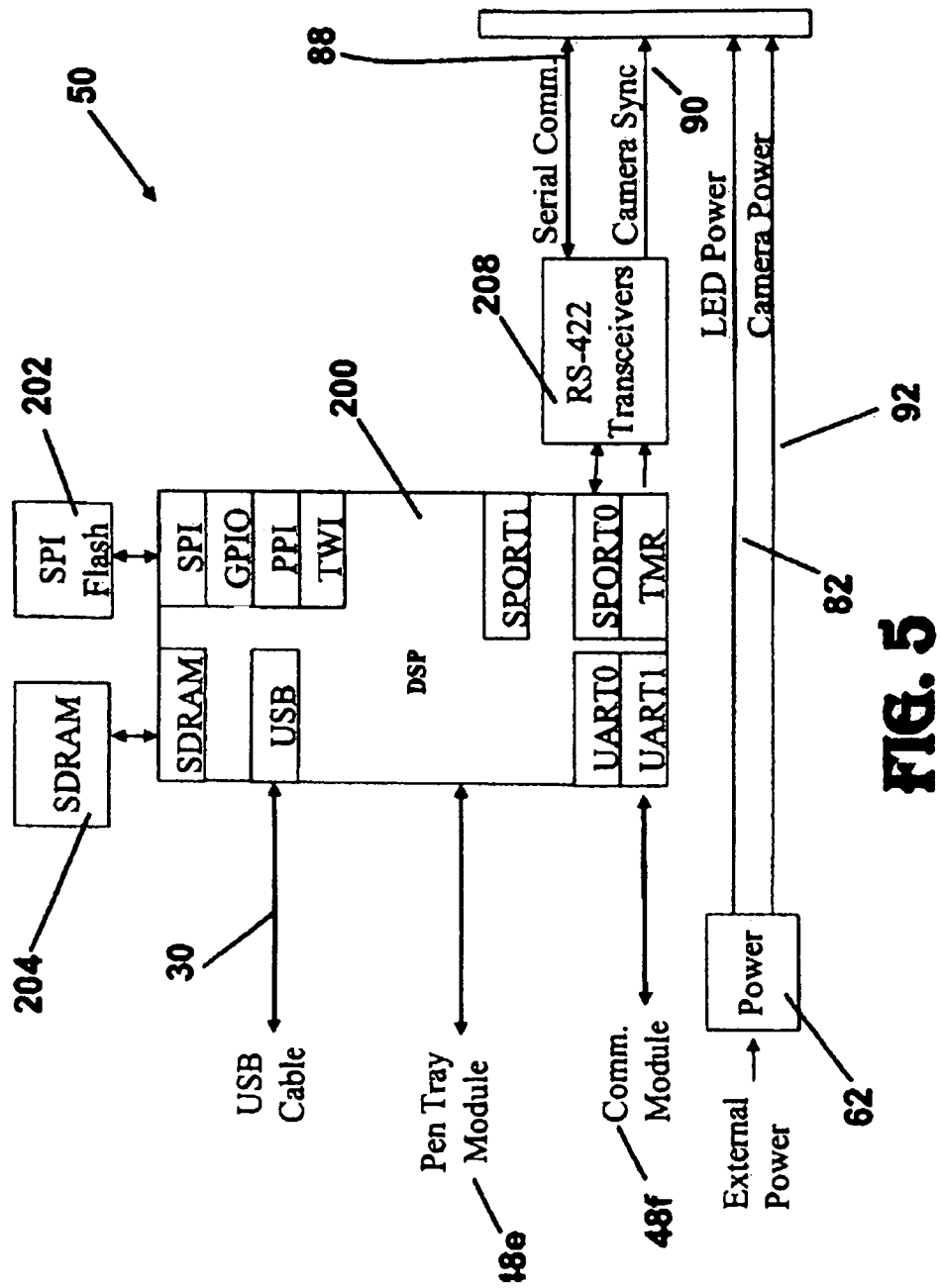
FIG. 5 is a block diagram of a master controller forming part of the interactive input system of FIG. 1.

Turning now to FIG. 5, the master controller 50 is better illustrated. As can be seen, master controller 50 comprises a DSP 200 such as that manufactured by Analog Devices under part number ADSP-BF522 Blackfin. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT) with the imaging assemblies 60 via an RS-422 transceiver 208 over the differential synchronous signal (DSS) communication link 88. In this embodiment, as more than one imaging assembly 60 communicates with the master controller DSP 200 over the DSS communication link 88, time division multiplexed (TDM) communications is employed. The DSP 200 also communicates with the imaging assemblies 60 via the RS-422 transceiver 208 over the synch line 90. DSP 200 communicates with the tool tray accessory module 48e over an inter-integrated circuit I$^2$C channel and communicates with the communications accessory module 48f over universal asynchronous receiver/transmitter (DART), serial peripheral interface (SPI) and I$^2$C channels.

The general purpose computing device 160 in this embodiment is a computer comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computer may also comprise a network connection to access shared or remote drives, one or more networked computers, or other networked devices.

During operation, the DSP 200 of the master controller 50 outputs synchronization signals that are applied to the synch line 90 via the transceiver 208. Each synchronization signal applied to the synch line 90 is received by the DSP 72 of each imaging assembly 60 via transceiver 86 and triggers a non-maskable interrupt (NMI) on the DSP 72. In response to the non-maskable interrupt triggered by the synchronization signal, the DSP 72 of each imaging assembly 60 ensures that its local timers are within system tolerances and if not, corrects its local timers to match the master controller 50. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84a to 84c are properly powered during the image frame capture cycle.

In response to the initiated pulse sequence, the image sensor 70 of each imaging assembly 60 acquires image frames at the desired image frame rate. In this manner, image frames captured by the image sensor 70 of each imaging assembly can be referenced to the same point of time allowing the position of pointers brought into the fields of view of the image sensors 70 to be accurately triangulated. Also, by distributing the synchronization signals for the imaging assemblies 60, electromagnetic interference is minimized by reducing the need for transmitting a fast clock signal to each image assembly 60 from the central location. Instead, each imaging assembly 60 has its own local oscillator (not shown) and a lower frequency signal (e.g. the point rate, 120 Hz) is used to keep image frame capture synchronized During image frame capture, the DSP 72 of each imaging assembly 60 also provides output to the strobe circuits 80 to control the switching of the IR LEDs 84a to 84c so that the IR LEDs are illuminated in a given sequence that is coordinated with the image frame capture sequence of each image sensor 70. In particular, in the sequence the first image frame is captured by the image sensor 70 when the IR LED 84c is fully illuminated in a high current mode and the other IR LEDs are off. The next image frame is captured when all of the IR LEDs 84a to 84c are off. Capturing these successive image frames with the IR LED 84c on and then off allows ambient light artifacts in captured image frames to be cancelled by generating difference image frames as described in U.S. Application Publication No. 2009/0278794 to McReynolds et al., assigned to SMART Technologies ULC, the content of which is incorporated herein by reference in its entirety. The third image frame is captured by the image sensor 70 when only the IR LED 84a is on and the fourth image frame is captured by the image sensor 70 when only the IR LED 84b is on. Capturing these image frames allows pointer edges and pointer shape to be determined as will be described. The strobe circuits 80 also control the IR LEDs 84a to 84c to inhibit blooming and to reduce the size of dark regions in captured image frames that are caused by the presence of other imaging assemblies 60 within the field of view of the image sensor 70.

During the image capture sequence, when each IR LED 84 is on, the IR LED floods the region of interest over the interactive surface 24 with infrared illumination. Infrared illumination that impinges on the retro-reflective bands of bezel segments 40, 42, 44 and 46 and on the retro-reflective labels 118 of the housing assemblies 100 is returned to the imaging assemblies 60. As a result, in the absence of a pointer, the image sensor 70 of each imaging assembly 60 sees a bright band having a substantially even intensity over its length together with any ambient light artifacts. When a pointer is brought into proximity with the interactive surface 24, the pointer occludes infrared illumination reflected by the retro-reflective bands of bezel segments 40, 42, 44 and 46 and/or the retro-reflective labels 118. As a result, the image sensor 70 of each imaging assembly 60 sees a dark region that interrupts the bright band 159 in captured image frames. The reflections of the illuminated retro-reflective bands of bezel segments 40, 42, 44 and 46 and the illuminated retro-reflective labels 118 appearing on the interactive surface 24 are also visible to the image sensor 70.

When an image frame is captured by the image sensor 70 of one of the imaging assemblies 60 when the IR LEDs 84 associated with the other imaging assemblies 60 are off during image frame capture, the IR LEDs 84 and the filter 110 of the other imaging assemblies 60 appear as dark regions that interrupt the bright band. These dark regions can be problematic as they can be inadvertently recognized as pointers. To address this problem, when the image sensor 70 of one of the imaging assemblies 60 is capturing an image frame and its associated IR LEDs 84 are on, the IR strobe circuits 80 of the other imaging assemblies 60 are conditioned by the DSPs 72 to a low current mode. In the low current mode, the strobe circuits 80 control the operating power supplied to the IR LEDs 84 so that they emit infrared backlighting at a level that is substantially equal to reflected illumination returned by the retro-reflective bands on the bezel segments 40, 42, 44 and 46 and retro-reflective labels 118. As a result, the size of each dark region is reduced. Operating the IR LEDs 84 in this manner also inhibits blooming (i.e. saturation of image sensor pixels) which can occur if the IR LEDs 84 of the other imaging assemblies 60 are fully on during image frame capture.

The sequence of image frames captured by the image sensor 70 of each imaging assembly 60 is processed by the DSP 72 to identify each pointer in each image frame and to obtain pointer shape and contact information as will be described. The DSP 72 of each imaging assembly 60 in turn conveys the pointer data to the DSP 200 of the master controller 50. The DSP 200 uses the pointer data received from the DSPs 72 to calculate the position of each pointer relative to the interactive surface 24 in (x,y) coordinates using well known triangulation as described in above-incorporated U.S. Pat. No. 6,803, 906 to Morrison. This pointer coordinate data along with pointer shape and pointer contact status data is conveyed to the general purpose computing device 28 allowing the image data presented on the interactive surface 24 to be updated.

Figure 6:
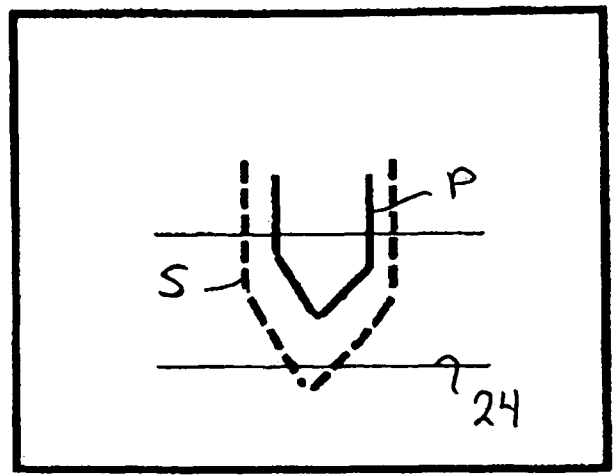
FIG. 6 is an exemplary image frame captured by the imaging assembly of FIG. 3 comprising a pointer and a pointer shadow.

The arrangement of the IR LEDs 84a to 84c employed by the imaging assemblies 60 may create shadows that appear in image frames as a pointer is brought proximate to the interactive surface 24 and into the fields of view of the image sensors 70. For example, when the IR LED 84c of an imaging assembly 60 that is conditioned to capture an image frame is illuminated, and a pointer is brought into proximity with the interactive surface 24, because the IR LED 84c is positioned above the image sensor 70 the pointer will cast a shadow that appears in the field of view of the image sensor 70 before the pointer actually makes contact with the interactive surface 24. In this case, the image frame captured by the image sensor 70 will include a dark region resulting from reflected backlight illumination that has been occluded by the pointer as well as a dark region corresponding to the shadow cast by the pointer on the bezel. Also, since the IR LED 84c is positioned above the image sensor 70, the shadow is cast from the higher and wider part of the pointer, and as a result, the dark region in the captured image frame resulting from the shadow will be dominate. In this case, the shape of the pointer tip and the contact status of the pointer relative to the interactive surface 24 will be obscured by the shadow. As will be appreciated, during image frame processing, this may result in early or false pointer contact detection for a pointer that is hovering over the interactive surface 24. For example, FIG. 6 is a representative image frame showing a pointer P being brought into proximity of the interactive surface 24 and the resulting shadow S (dotted lines) cast by the pointer when the IR LED 84c is illuminated. As can be seen, in this situation, although the pointer P is not in contact with the interactive surface 24, the shadow S dominates the image frame and appears in contact with the interactive surface 24. The shadow S also distorts the shape of the pointer P, in this case making the pointer appear larger than it actually is.

Figure 7:
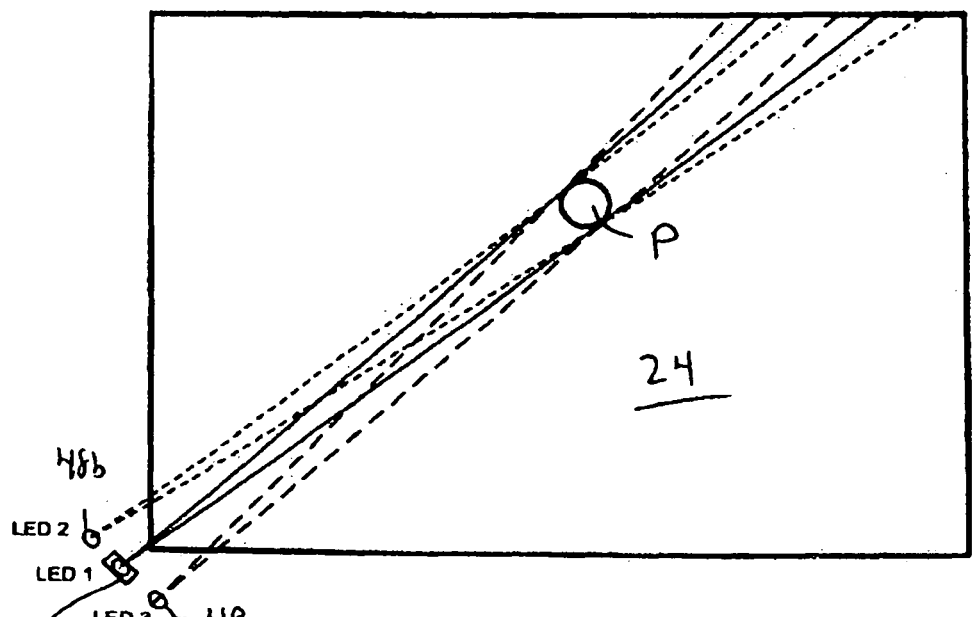
FIG. 7 is a top plan view of a portion of the interactive input system of FIG. 1.

In order to improve the visualization of a pointer brought into proximity of the interactive surface 24 and to make the pointer contact detect and pointer type identification more reliable, the IR LEDs 84a and 84b are employed by each imaging assembly 60. FIG. 7 is a top view of the interactive board 22 showing the IR LEDs 84a to 84c for only one of the imaging assemblies 60.

Figure 8:
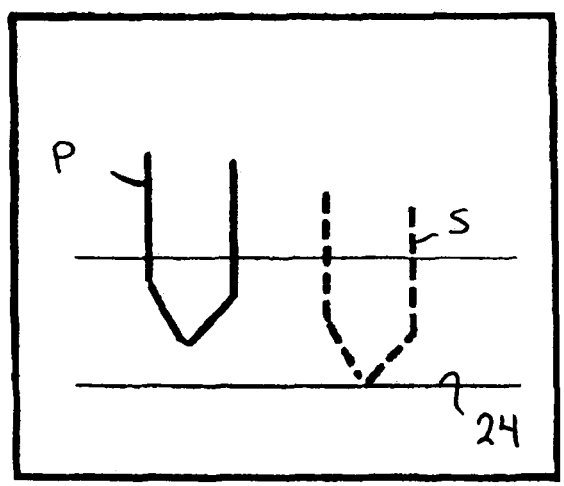
FIG. 8 is another exemplary image frame captured by the imaging assembly of FIG. 3 comprising a pointer and a pointer shadow.

When the IR LED 84b is on during image frame capture, the shadow cast by the pointer is to the right of the actual pointer. In this case, when the pointer is distant from the image sensor 70, the shadow cast by the pointer P overlaps with the pointer. When the pointer P is proximate to the image sensor 70, the shadow S cast by the pointer is spaced from the pointer P as shown in FIG. 8. Likewise, when the IR LED 84a is on during image frame capture, the shadow cast by the pointer P is to the left of the pointer. In this case, when the pointer is distant from the image sensor 70, the shadow cast by the pointer overlaps with the pointer. When the pointer P is proximate to the image sensor 70, the shadow cast by the pointer is spaced from the pointer. In scenarios where the shadows are spaced from the pointers, the dark regions in captured image frames representing the pointer and the dark regions representing the shadows do not conflict allowing the shape of the pointer tip to be reliably detected. Pointer hover can also be differentiated from the cast shadows which extend to the interactive surface 24. As a result, the dark regions in the captured image frames representing the pointer allow the pointer shape and pointer contact status to be accurately determined.

Figure 9A:
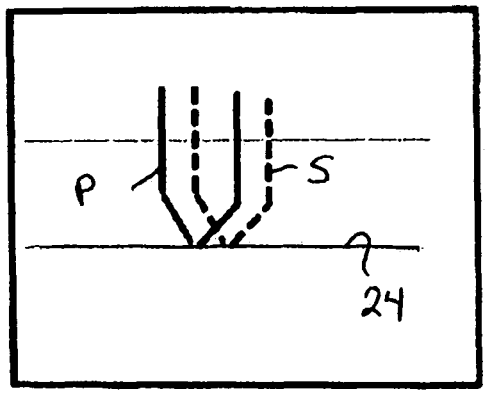
FIGS. 9A and 9B are further exemplary image frames captured by the imaging assembly of FIG. 3 comprising pointers and pointer shadows.
Figure 9B:
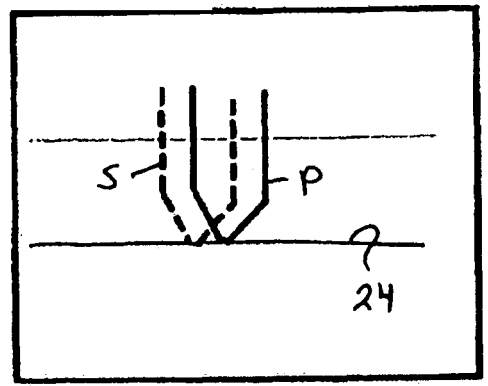
Figure 10A:
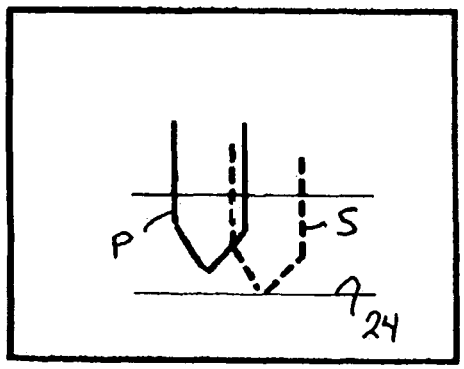
FIGS. 10A and 10B are still further exemplary image frames captured by the imaging assembly of FIG. 3 comprising pointers and pointer shadows.
Figure 10B:
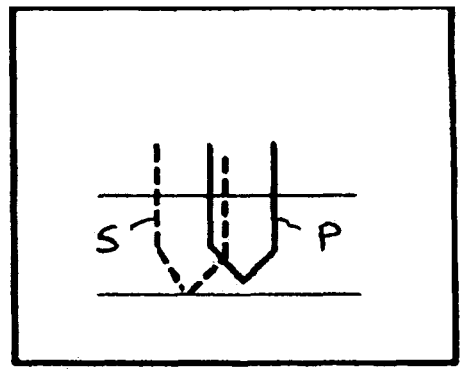

FIGS. 9a and 9b are captured image frames highlighting the scenario where the shadow S of the pointer P is very close to the pointer, which signifies that the pointer is far away from the imaging assembly 60 that captured the image frame. In this example, the pointer P is in contact with the interactive surface 24. FIGS. 10a and 10b are captured image frames highlighting the scenario where the pointer P hovers above the interactive surface 24. In this case, the pointer P is closer to the image sensor 70 and as a result the shadow S and actual pointer are moving apart.

Figure 11:
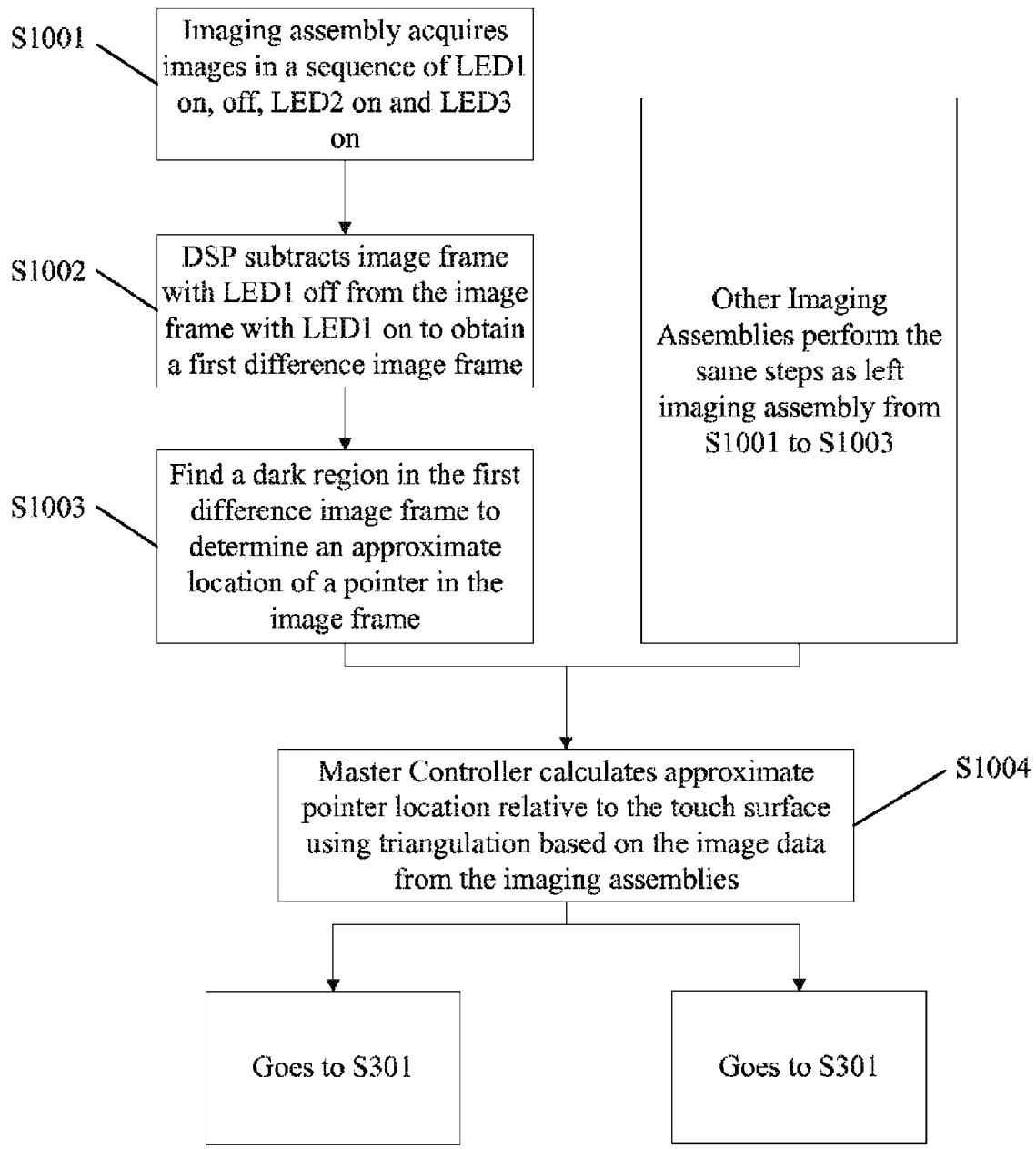
FIG. 11 is a flowchart showing steps performed during processing of image frames captured by imaging assemblies of the interactive input system of FIG. 1.

FIG. 11 is a flowchart better illustrating the steps performed during image frame capture. As previously mentioned, the DSP 72 of each imaging assembly 60 conditions the image sensor 70 thereof to acquire a group of four (4) image frames in each image sensor exposure cycle with the IR LEDs 84a to 84c operated in the following sequence during image frame capture (step S1001):

(1) only IR LED 84c on;
(2) all IR LEDs off;
(3) only IR LED 84a on; and
(4) only IR LED 84b on.

Figure 12:
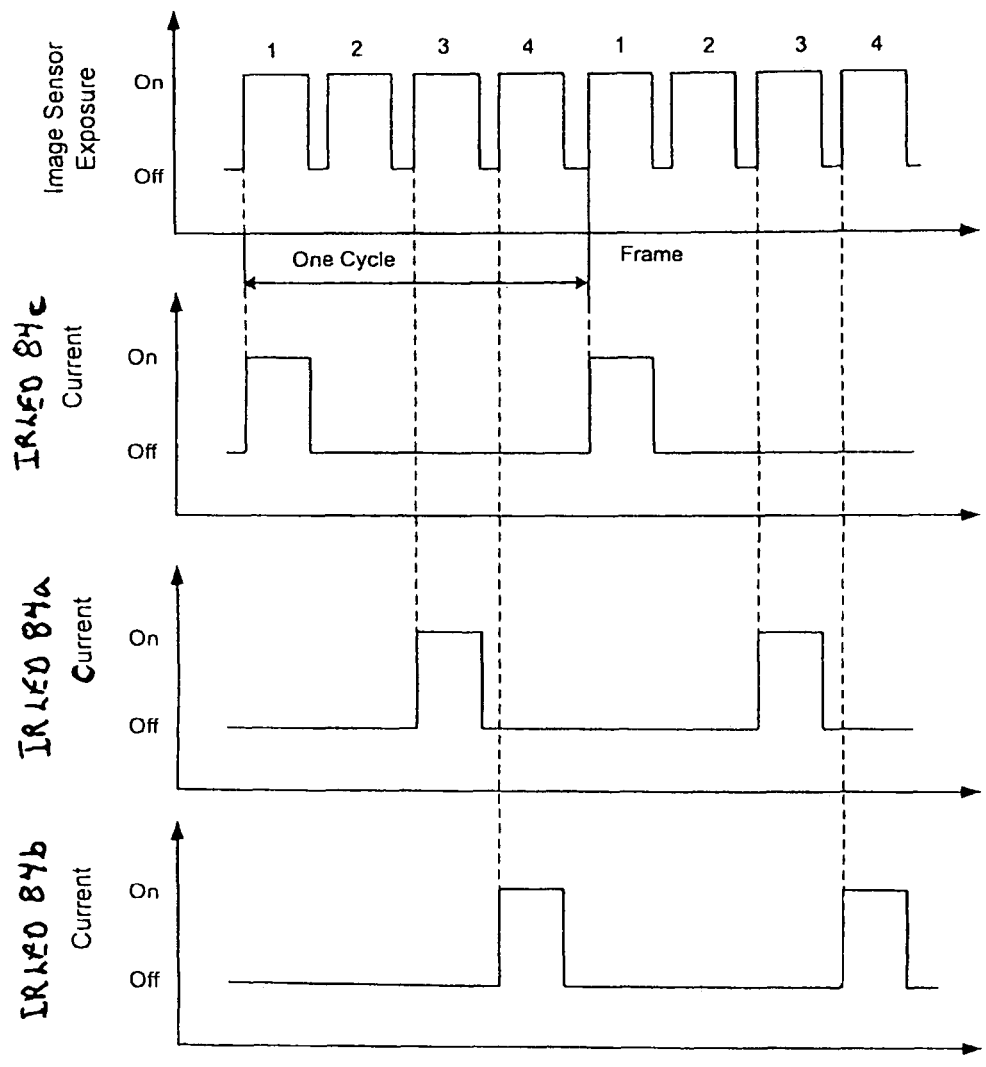
FIG. 12 shows illumination source current and image sensor exposure timing diagrams for the interactive input system of FIG. 1.

FIG. 12 shows IR LED current and image sensor exposure timing diagrams for this operation sequence.

The image frames captured by each image sensor 70 over each exposure cycle are conveyed to its associated DSP 72. In response to the received image frames, each DSP 72 initially performs ambient light artifact cancellation by subtracting the image frame captured only with IR LED 84c on from the image frame captured with all IR LEDs off thereby to form a difference image frame that is devoid of ambient light artifacts (step S1002). The DSP 72 then examines the pixels of the difference image frame and computes a vertical intensity profile (VIP) for the difference image frame. The VIP comprises a single number for each column of the difference image frame. The number for each column provides an indication as to the presence of a pointer in the column of the difference image frame. The DSP 72 in turn performs continuity calculations to identify the pointer in the difference image frame and to determine an approximate location of the pointer in the difference image frame (step S1003). During the continuity calculations, for the columns of the difference image frame where the pointer is believed to exist, the DSP 72 compares the values of the pixels corresponding to the height of the retroreflective band to the values of an equal number of pixels above the retroreflective band. If no pointer is present then this comparison will reveal a high contrast result. If a pointer exists, whether bright or dark, the lighting will be approximately equal in both regions and the comparison will yield a low contrast result. With the approximate location of the pointer in the difference image frame determined, each DSP 72 conveys the approximate pointer location information to the DSP 200 of the master controller 50 via the DSS communications link 88.

When the DSP 200 receives the approximate pointer location information from the DSPs 72, the DSP 200 calculates an approximate position of the pointer relative to the interactive surface 24 in (x,y) coordinates using well known triangulation as described above (step S1004).

Figure 13:
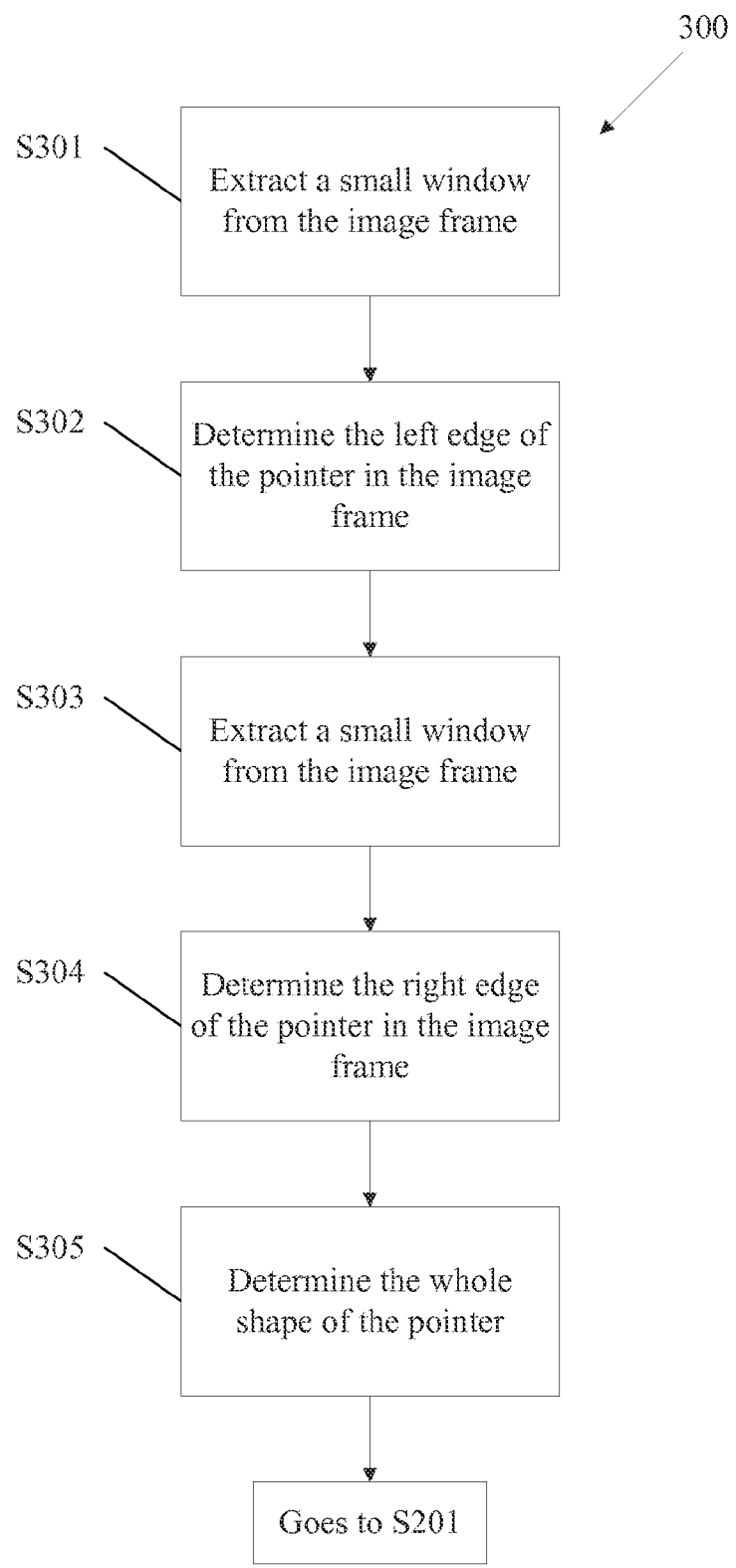
FIGS. 13 and 14 are flowcharts showing steps performed during processing of image frames captured by imaging assemblies of the interactive input system of FIG. 1.

Once the approximate pointer position has been calculated by the DSP 200, the DSP 200 instructs the DSPs 72 of the imaging assemblies 60 to perform pointer edge and shape detection as well as to determine pointer contact status. During pointer edge and shape detection, each DSP 72 processes the image frame captured with only IR LED 84a on and the image frame captured only with IR LED 84b on to locate the pointer and its cast shadow in the image frames and to extract a window of image frame data therefrom that includes the pointer and its shadow (steps S301 and S303 in FIG. 13). The extracted windows of image frame data are then analyzed to detect clear edges of the pointer. As can be seen from FIGS. 9a and 9b and FIGS. 10a and 10b, the pointer P is distorted in captured image frames by the cast shadows. The right edges of the pointer P in FIGS. 9a and 10a are overlapped with the cast shadows and the left edges of the pointer P in FIGS. 9b and 10b are overlapped with the cast shadows, resulting in unclear pointer edges that may possibly lead to pointer location inaccuracies. Therefore, using each pair of captured image frames, the left and right edges of the pointer can be determined. In particular, DSP 72 uses the image frame captured only when the IR LED 84b is on as shown in FIGS. 9a and 10a to determine the left edge of the pointer (step S302) since the left edge is not affected by a cast shadow and uses the image frame captured only when the IR LED 84a is on as shown in FIGS. 9b and 10b to determine the right edge of the pointer (step S304) since the right edge is not affected by a cast shadow. After the left and right edges of the pointer are determined, the DSP 72 determines the shape of the pointer (step S305).

In order to determine pointer contact status relative to the interactive surface 24, one of two methods is employed. One of the methods for pointer contact status detection is similar to that disclosed in U.S. Pat. No. 6,947,032 to Morrison et al. assigned to SMART Technologies ULC, the content of which is incorporated herein by reference in its entirety. During this method, the DSP 72 of each imaging assembly compares the pointer in the image frames with a reflection of the pointer in the image frames to determine if the pointer and its reflection are touching. If so, the pointer is determined to be in contact with the interactive surface 24 and if not, the pointer is determined to be hovering over the interactive surface.

Figure 14:
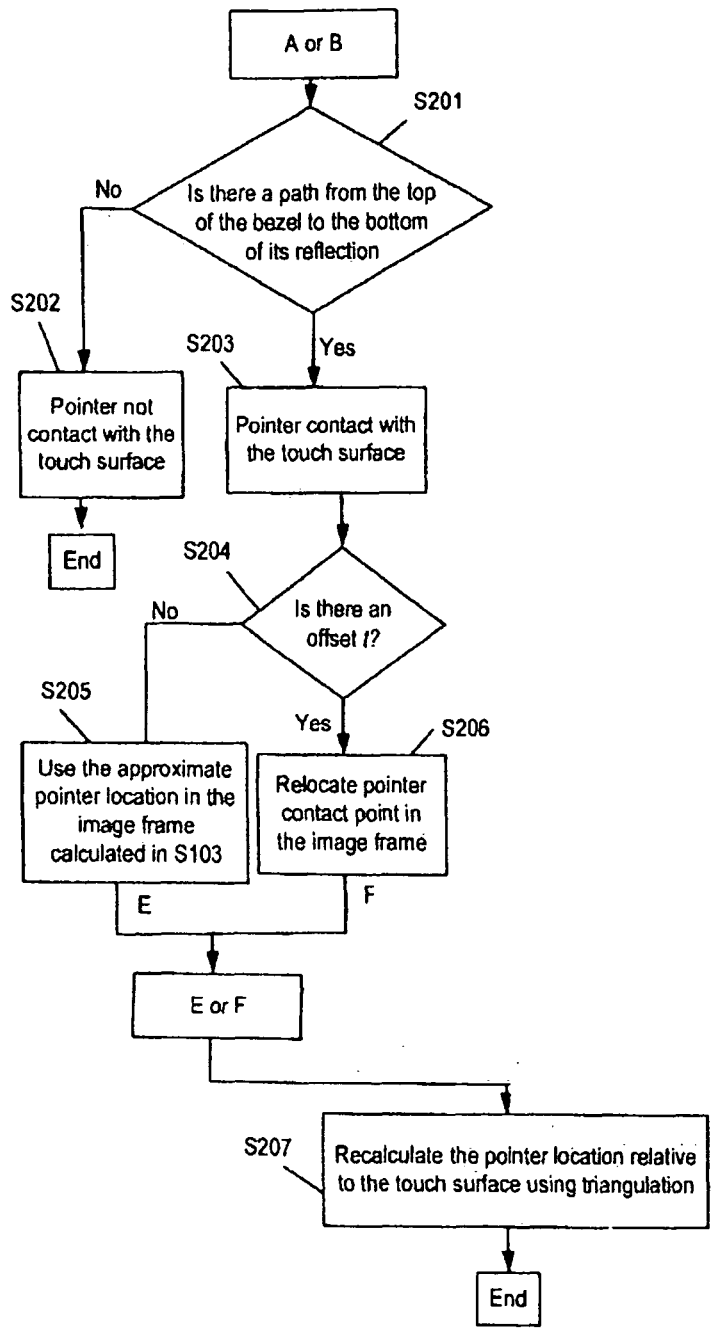
Figure 15A:
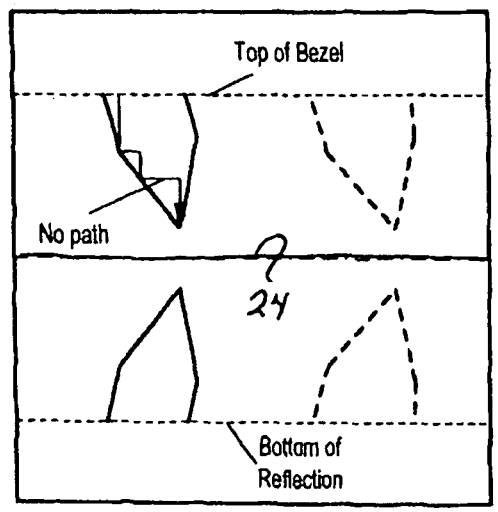
FIGS. 15A and 15B are exemplary image frames captured by the imaging assembly of FIG. 3 comprising a bezel and its reflection together with a pointer and its reflection.
Figure 15B:
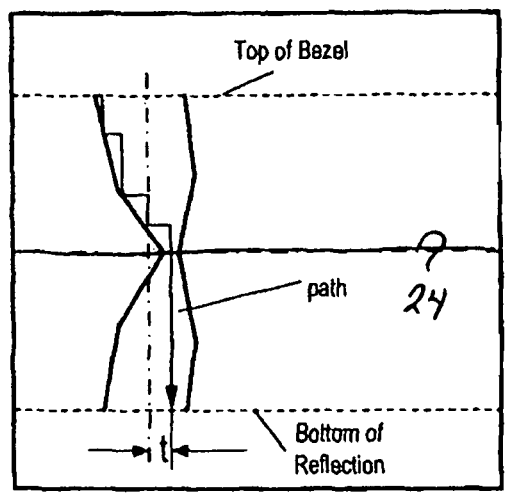

An alternate method is to find a path from the top of the bezel to the bottom of the reflection of the bezel in each image frame (step S201 in FIG. 14). If there is no path from the top of the bezel to the bottom of the bezel reflection in the image frame as shown in FIG. 15A, pointer hover is detected (step S202). If there is a path from the top of the bezel to the bottom of the bezel reflection in the image frame as shown in FIG. 15B, pointer contact with the interactive surface 24 is detected (step S203).

If pointer contact is detected at step S203 by a DSP 72, the approximate location of the pointer contact in the image frame is reevaluated. Initially, the location of pointer contact is assumed to be on the centerline of the dark region representing the pointer in the captured image frames. However, the image frames are sometimes distorted due to tilt of the pointer as also shown in FIGS. 15A and 15B. In this case, it is necessary to find the actual pointer contact location. Therefore, at step S204, the DSP 72 detects if there is an offset t between the centerline of the pointer and the center of the narrowest part of the pointer in the captured image frame. If there is no offset t, the pointer is considered to be perpendicular to the interactive surface 24. As a result, no adjust to the approximate pointer location calculated at step S1003 is required as this calculated pointer location is the actual pointer location (step S205). If there is an offset t, the pointer is determined to be tilted. The approximate pointer location calculated at step S1003 is then adjusted to correspond to the center of the narrowest part of the pointer in the image frame (step S206) and the adjusted pointer location is transmitted to the DSP 200.

At step S207, the DSP 200 uses the adjusted pointer locations to triangulate and recalculate the pointer contact coordinates relative to the interactive surface 24. In this way, accurate contact status and pointer locations relative to the interactive surface 24 in (x,y) coordinates can be determined.

Figure 16:
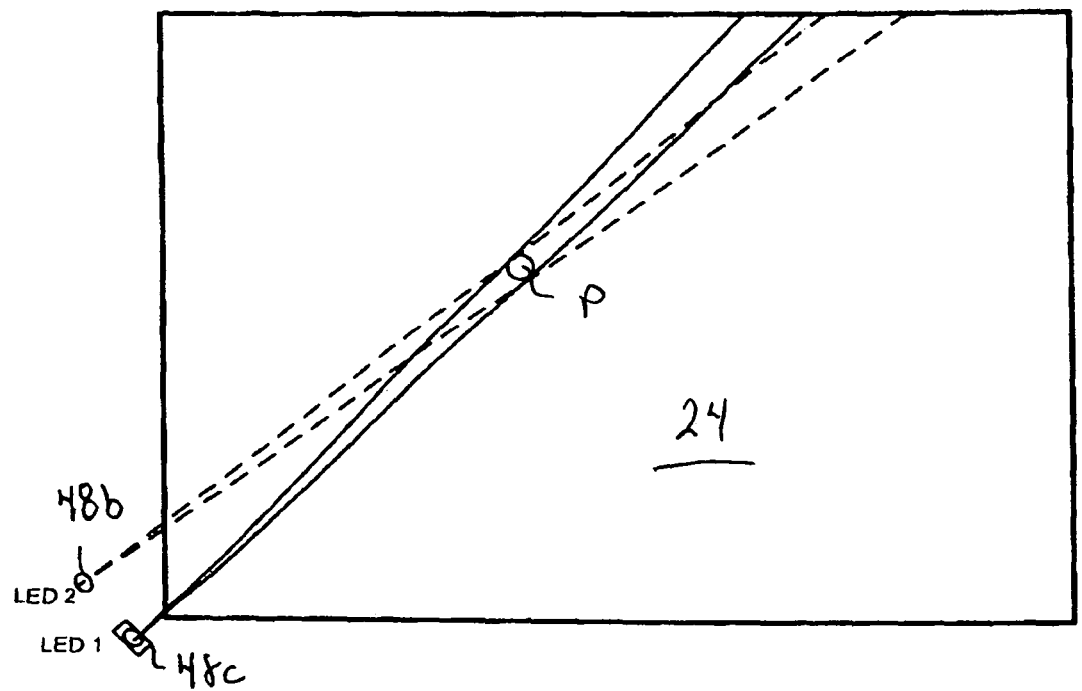
FIG. 16 is a top plan view of a portion of an alternative interactive input system.

Although the imaging assemblies 60 are shown as comprising three IR LEDs, fewer IR LEDs may be employed. For example, FIG. 16 shows an imaging assembly comprising only two IR LEDs 48b and 48c. Similar to the previous embodiment, both IR LEDs are used to provide backlight illumination during each image sensor exposure sequence.

In this embodiment, the image frames are processed in a manner similar to that described above to determine pointer hover or contact. By measuring the distance between the pointer and its shadow in captured image frames (defined as shadow offset) and knowing the geometry of the interactive surface 24, the distance from the image sensor 70 to the pointer can be estimated.

Figure 17:
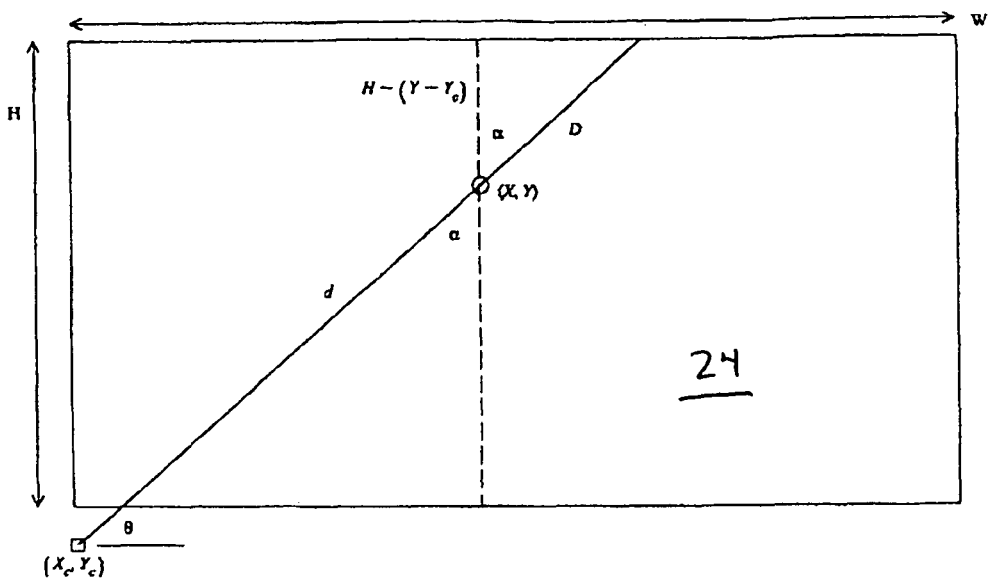
FIGS. 17 and 18 are top plan views showing geometries of the alternative interactive input system of FIG. 16.
Figure 18:
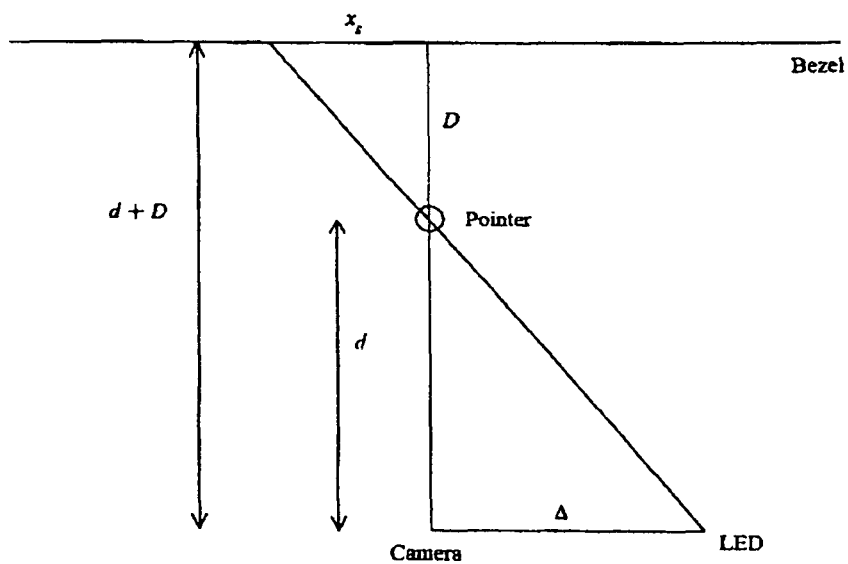

The calculation for the shadow offset will now be described. The geometry of the interactive surface 24 is shown in FIGS. 17 and 18. The first step of the shadow offset calculation is to compute the image sensor-bezel distance. The interactive surface 24 is assumed to have a known height H and width W. The distance d from the pointer (X, Y) to the image sensor $(X_c, Y_c)$ is $$d^2 = (X-X_c)^2 + (Y-Y_c)^2 \tag{1}$$

A relationship between d and D is found by computing $\cos(\alpha)$:

$$\cos(\alpha) = \frac{H-(Y-Y_c)}{D} = \frac{Y-Y_c}{d} \tag{2}$$

The pointer to the bezel distance can be found as:

$$D = \frac{d \cdot (H-(Y-Y_c))}{Y-Y_c} \tag{3}$$

Therefore, the image sensor-bezel distance is d+D.

The shadow offset $x_s$ is a function of the pointer to image sensor distance d and also a function of the pointer to bezel distance D. The geometry for their relationship is shown in FIG. 17. The shadow offset $x_s$ can be calculated using the following equation:

$$x_s = \frac{D}{d}\Delta \tag{4}$$

where $\Delta$ is the horizontal distance between the IR LED 48b and the image sensor focal point.

A value for the shadow offset $x_s$ in pixels can by found by solving the expression:

$$x_s = f \cdot D \cdot \frac{\Delta}{d \cdot (d+D)} \quad (5)$$

By way of example, if the IR LED 48b to the image sensor focal point distance $\Delta=2.5$ cm, the image sensor-bezel distance d+D=230 cm, the pointer to image sensor distance d=100 cm, and the image sensor focal f=400 pixels, then solving equation (5) yields a shadow offset of $x_s$=5.7 pixels.

Figure 19:
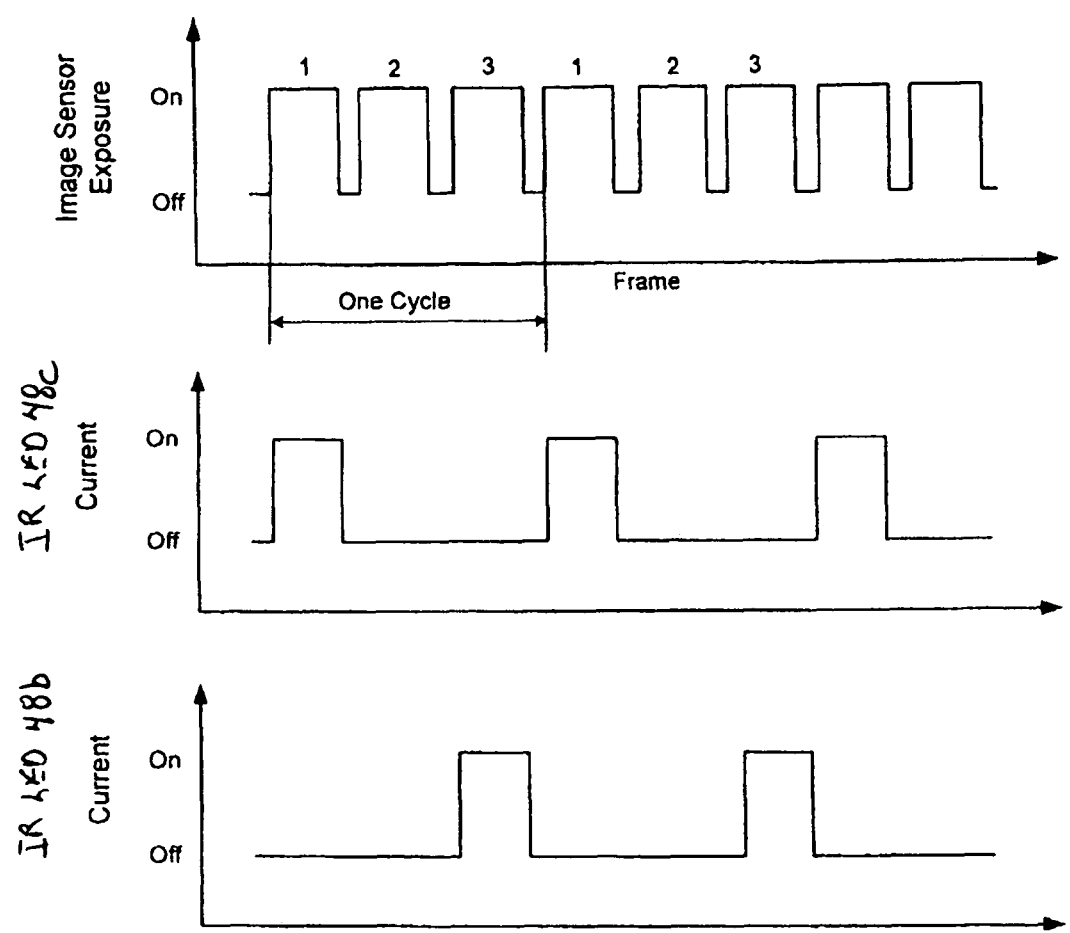
FIG. 19 shows illumination source current and image sensor exposure timing diagrams for the interactive input system of FIG. 16.

The IR LEDs 48b and 48c for each imaging assembly 60 can be controlled in one of two ways during each image sensor exposure sequence. In a first method, the image sensor 70 of each imaging assembly 60 is conditioned to acquire a group of three (3) image frames in each exposure cycle with the IR LEDs 84b and 84c operated in the following sequence:
(1) only IR LED 84c on;
(2) both IR LEDs 84b and 84c off; and
(3) only IR LED 84b on.
FIG. 19 shows IR LED current and image sensor exposure timing diagrams for this operation sequence.

The other method is to modulate both LEDs simultaneously with two different Walsh codes. This technique is disclosed in U.S. Patent Application Publication No. 2009-0278794 to McGibney et al. entitled "Interactive Input System with Controlled Lighting" filed on May 9, 2008, assigned to SMART Technologies, ULC of Calgary, Alberta, Canada, assignee of the subject application, the content of which is incorporated herein by reference in its entirety.

During image frame processing when only two IR LEDs are employed, the image frames captured by each image sensor 70 over each exposure cycle are conveyed to its associated DSP 72. In response to the received image frames, each DSP 72 initially performs ambient light artifact cancellation by subtracting the image frame captured only with IR LED 84c on from the image frame captured with both IR LEDs off thereby to form a difference image frame that is devoid of ambient light artifacts. The DSP 72 then examines the pixels of the difference image frame and computes the vertical intensity profile (VIP) for the difference image frame and performs the continuity calculations as described above to identify the pointer in the difference image frame and to determine an approximate location of the pointer in the difference image frame. With the approximate location of the pointer in the difference image frame determined, each DSP 72 conveys the pointer location information to the DSP 200 of the master controller 50 via the DSS communications link 88. Transmission of the pointer location information to the DSP 200 is performed at a reduced frame rate (nominally 120 frames per second).

Thereafter, the DSP 72 calculates the shadow offset $x_s$ for the image frames generated by the imaging assemblies. For each image frame, if the shadow offset $x_s$ is greater than a threshold, signifying that the shadow of the pointer is totally separated from the pointer, the DSP extracts a window of the difference image frame that includes the pointer and its shadow and proceeds to step S201 shown in FIG. 14. If the shadow offset $x_s$ is less than the threshold, signifying that the shadow of the pointer overlaps with the pointer, the DSP extracts a window of a difference image frame resulting from the subtraction of the image frame captured with IR LEDs 48b and 48c off from the image frame captured with IR LED 48b on and then proceeds to step S201.

Although in the embodiments described above, the IR LED light sources 82 are described as operating in a low current mode during the entire camera synchronization signal, one of ordinary skill in the art will appreciate that the low current mode duration may be reduced.

Although in the embodiments described above, feedback is not used to control the illumination of the IR light sources 82, one of ordinary skill in the art will appreciate that feedback may be employed to match the IR light source illumination to the intensity of illumination reflected by the retro-reflective bezel. In order to do so, the image frames captured by the imaging assemblies 60 can be used to adjust the brightness (eg. the current) of the opposing IR illumination sources. Such feedback may be advantageous to reduce the complexity of the image processing algorithms.

Although the embodiments described above show a central, synchronized technique for coordinating imaging assembly exposures, one of ordinary skill in the art will appreciate that time stamping and interpolation of captured image frames is possible for asynchronous systems.

One of ordinary skill in the art will also appreciate that calibration may be necessary in order to match the brightness of the IR illumination sources to the retro-reflective bezel. The calibration may be performed manually or automatically using feedback from the opposing imaging assemblies. One of ordinary skill the art will also appreciate that the brightnesses of the IR illumination sources do not precisely have to match the intensity of illumination reflected by the retro-reflective bezel.

Although the embodiments described above show DSPs located at each imaging assembly, those of ordinary skill in the art will appreciate that a single processor, a single processor with multiple cores, or multiple processors with multiple cores could be used to achieve the same results. Further, the processor is not limited to a DSP but could be a general purpose processor, microcontroller, or other processing device. The processor could also be integrated into the imaging sensor.

Although the embodiments described above show two or three IR illumination source per imaging assembly, those of ordinary skill in the art will appreciate that there are instances where more than three illumination source per imaging assembly may be advantageous.

Although in embodiments described above, the frame rate of the imaging assemblies is 960 Hz, as mentioned previously, the interactive input system is not limited to these frequencies. For example, the image sensors of the imaging assemblies may be capable of very high frame rates, such as those on the order of $10^6$ frames per second, or very low frame rates, such as 30 frames per second. Although the amount of information that may be transmitted increases as the frame rate increases, the systems and methods described above are feasible using imaging assemblies having low frame rates.

Although the embodiments described above comprise a retro-reflective bezel, one of ordinary skill in the art will appreciate that other bezel background configurations may be employed.

In the embodiments described above, the imaging assemblies 60 are described as communicating with the master controller 50 via a DSS communication link. Other communication links such as a parallel bus; a universal serial bus (USB), an Ethernet connection or other suitable wired connection may however be employed. Alternatively, the imaging assemblies 22 may communicate with the master controller 50 over a wireless connection using a suitable wireless protocol such as for example Bluetooth, WiFi, ZigBee, ANT, IEEE 802.15.4, Z-Wave etc. Also, the master controller 50 is described as communicating with the general purpose computing device 28 via a USB cable 30. Alternatively, the master controller 50 may communicate with the general purpose computing device 28 over another wired connection such as for example, a parallel bus, an RS-232 connection, an Ethernet connection etc. or may communicate with the general purpose computing device 28 over a wireless connection using a suitable wireless protocol such as for example Bluetooth, WiFi, ZigBee, ANT, IEEE 802.15.4, Z-Wave etc.

Although various embodiments have been described, those of skill in the art will appreciate that other variations and modifications may be made with departing from the spirit and scope thereof as defined by the appended claims.

What is claimed is:

1. An illumination assembly for an interactive input system, comprising:
   at least one imaging device capturing image frames of a region of interest;
   a plurality of illumination sources associated with said imaging device and being located at different positions relative to said imaging device, said illumination sources providing illumination to said region of interest, wherein one illumination source of said plurality is generally vertically aligned with the imaging device and wherein other illumination sources of said plurality are positioned on opposites sides of the imaging device; and
   a controller communicating with said illumination sources, said controller conditioning said illumination sources so that the illumination sources provide illumination to said region of interest in succession, the timing of image frame capture by said imaging device being coordinated with the illumination pattern of said illumination sources so that during an image sensor exposure cycle, one image frame is captured by the imaging device with only the one illumination source that is vertically aligned with the image device being on, another image frame is captured with all of the illumination sources being off, another image frame is captured with only each other illumination source that is positioned on one side of the imaging device being on and another image frame is captured with only each other illumination source that is positioned on the other side of the imaging device being on.

2. The illumination assembly of claim 1 wherein said one illumination source is positioned above said at least one imaging device.

3. The illumination assembly of claim 1 wherein the other illumination sources positioned on opposite sides of the imaging device are generally in the same plane as said imaging device.

4. The illumination assembly of claim 1 wherein said illumination sources are infrared (IR) illumination sources.

5. An interactive input system comprising:
   a plurality of imaging devices configured to image a region of interest from different vantages;
   a plurality of illumination sources associated with each imaging device, wherein for each imaging device the illumination sources of said plurality are located at different positions relative to the imaging device and provide illumination to said region of interest with illumination sources being positioned on opposite sides of the imaging device and with at least one illumination source being vertically aligned with the imaging device; and
   processing structure communicating with the imaging devices, wherein each imaging device is configured to acquire image frames of the region of interest over an image sensor exposure cycle with the image frames being acquired in different lighting scenarios so that for the image sensor exposure cycle, each imaging device captures one image frame with only the at least one illumination source vertically aligned with the imaging device being on, captures another image frame with all illumination sources being off, captures another image with only each illumination source positioned on one side of the imaging device being on and captures another image frame with only each illumination source positioned on the other side of the imaging device being on and wherein said processing structure processes the captured image frames to detect the existence of a pointer therein.

6. The interactive input system of claim 5 wherein, for each imaging device, said processing structure is configured to form difference image frames by subtracting image frames captured when no illumination sources associated with each imaging device illuminate said region of interest from image frames captured when the illumination source that is vertically aligned with the imaging device illuminates said region of interest to remove ambient light artifacts and to examine said difference image frames to locate regions in said difference image frames representing said pointer.

7. The interactive input system of claim 5 wherein said at least one illumination source that is vertically aligned with said imaging device is positioned above said imaging device.

8. The interactive input system of claim 5 wherein said illumination sources that are positioned on opposite sides of said imaging device are in generally the same plane as said imaging device.

9. The interactive input system of claim 5 wherein said illumination sources are infrared (IR) illumination sources.

10. A method comprising:
    acquiring, during an image sensor exposure cycle, multiple image frames of a region of interest using a plurality of imaging devices having fields of view aimed at the region of interest from different vantages;
    during the acquiring, adjusting illumination provided to said region of interest so that each image frame is acquired in a different lighting scenario, wherein one image frame is acquired when the region of interest is illuminated only by an illumination source that is vertically aligned with said imaging device, another image frame is acquired when the region of interest is illuminated only by each illumination source positioned to one side of said imaging device, another image frame is acquired when the region of interest is illuminated only by each illumination source positioned to the other side of said imaging device, and another image frame is acquired when the region of interest is not illuminated by the illumination sources; and
    processing the image frames to detect the existence of a pointer therein.

11. The method of claim 10 wherein during said processing, a difference image frame is formed by subtracting the image frame captured when the region of interest is not illuminated by the illumination sources from the image frame captured when the region of interest is illuminated by the illumination source that is vertically aligned with the image device to remove ambient light artifacts and to examine said difference image frames to locate regions in said difference image frames representing said pointer.

12. The method of claim 11 wherein during said processing, the center of each region is determined and designated as the center of said pointer.

13. The method of claim 10 wherein said processing further comprises examining the acquired image frames to detect the shape of the pointer and to detect contact of the pointer with a surface within said region of interest.

* * * * *